United States Patent [19]

Lawhon

[11] Patent Number: 4,624,805

[45] Date of Patent: Nov. 25, 1986

[54] PROCESS FOR RECOVERY OF PROTEIN FROM AGRICULTURAL COMMODITIES PRIOR TO ALCOHOL PRODUCTION

[75] Inventor: James T. Lawhon, College Station, Tex.

[73] Assignee: The Texas A&M University System, College Station, Tex.

[21] Appl. No.: 655,037

[22] Filed: Sep. 27, 1984

[51] Int. Cl.$^4$ ............................................. A23J 1/12
[52] U.S. Cl. ...................................... 530/376; 426/14; 426/656; 530/370; 530/372
[58] Field of Search ............ 260/123.5, 112 R, 112 G; 426/14, 656

[56] References Cited

U.S. PATENT DOCUMENTS

| | | | |
|---|---|---|---|
| 3,622,556 | 11/1971 | O'Connor | 260/123.5 |
| 3,728,327 | 4/1973 | Frazeur et al. | 260/123.5 |
| 3,736,147 | 5/1973 | Iacobucci et al. | 260/123.5 X |
| 3,790,553 | 2/1974 | Rao et al. | 260/112 |
| 3,799,806 | 3/1974 | Madsen | 127/54 |
| 3,939,281 | 2/1976 | Schwengers | 426/11 |
| 3,993,636 | 11/1976 | Maubois et al. | 260/123.5 |
| 3,995,071 | 11/1976 | Goodnight, Jr. et al. | 260/123.5 X |
| 4,035,515 | 7/1977 | Cunningham | 426/14 |
| 4,088,795 | 5/1978 | Goodnight, Jr. et al. | 260/123.5 X |
| 4,091,120 | 5/1978 | Goodnight, Jr. et al. | 260/123.5 X |
| 4,163,010 | 7/1979 | Garbutt | 260/112 |
| 4,266,981 | 5/1981 | Tsao et al | 127/37 |
| 4,281,063 | 7/1981 | Tsao et al. | 435/99 |
| 4,332,719 | 6/1982 | Lawhon et al. | 260/123.5 |
| 4,359,530 | 11/1982 | Brown | 435/68 |
| 4,420,425 | 12/1983 | Lawhon | 260/123.5 |

OTHER PUBLICATIONS

J. S. Wall, "Energy-Saving Methods for Recovery of Usable Protein from Alcohol or Methane Fermentation Media", Report of the Northern Regional Research Center, U.S.D.A., 145-6 (May 1981).
L. H. Daley et al, "Food Applications of a Corn Protein Concentrate", Miles Laboratories, Inc. Alkart, Indiana.
Y. V. Wu et al, "Protein Concentrate from Normal and High-Lysine Corns by Alkaline Extraction: Preparation", 41 Journal of Food Science, 509-511 (1976).
Y. V. Wu, "Protein Concentrate from Normal and High-Lysine Sorghums: Preparation, Composition, and Properties", 26 J. Agric. Food Chem., 305-309 (1978).
L. D. Satterlee et al, "The Chemical, Functional, and Nutritional Characterization of Protein Concentrates from Distiller's Grains", 53 Cereal Chemistry, 739-749 (1976).

*Primary Examiner*—Howard E. Schain
*Attorney, Agent, or Firm*—Arnold, White & Durkee

[57] ABSTRACT

A process is provided for recovering food grade protein from agricultural commodities such as corn, for example, prior to alcohol production. The process involves extracting the protein with an alkali or alkali/alcohol solution either with or without sonication. The protein is recovered from the extract by ultrafiltration and the dissolved sugars and starches in the permeate are concentrated by reverse osmosis for addition to the nonprotein constituents for alcohol production.

18 Claims, 1 Drawing Figure

FIG. 1

PROCESS FOR RECOVERY OF PROTEIN FROM AGRICULTURAL COMMODITIES PRIOR TO ALCOHOL PRODUCTION

BACKGROUND OF THE INVENTION

The present invention relates to processes for recovering protein from agricultural commodities such as corn and, more particularly, relates to processes for recovering protein from agricultural commodities which are used for alcohol production.

The world is faced with a critical shortage of energy from conventional fuels, thus necessitating the development of alternate or supplemental fuels. However, alternate fuels must be produced as economically as possible in order to be competitive with existing fuels while simultaneously avoiding the creation of new shortages due to consumption of resources needed elsewhere.

One alternate fuel that has received a lot of attention is alcohol which is produced from food crops. Corn is the primary food crop being used in the production of fuel grade alcohol. Its use in the production of fuel alcohol has sparked controversy and concern. Opponents claim that the use of corn and other food crops to produce fuel will intensify the decline in per capita food production on a worldwide basis.

Since only sugars and starches from the corn are used in the production of alcohol, efforts have been made to recover the protein and other unused components of the grain. For example, as conventionally processed, stillage and residual spent grains which comprise roughly one third of the weight of the corn and include all of the corn protein, are used as an animal feed ingredient. Some attempts to recover food protein from fermented grains and stillage have been attempted. However, the quality and quantity of recoverable protein has been low, thus making it generally unsuitable as a food supplement for human consumption.

One process for recovering protein from stillage is set forth in Satterlee, et al., "The Chemical, Functional, and Nutritional Characterization of Protein Concentrates from Distillers' Grains," 53 *Protein Concentrates* 739-749 (1976). In this process, the stillage from the fermentation process was centrifuged and separated into a syrup and wet solids. The wet solids were mixed with sodium hydroxide at a pH of 12.2 to extract the protein. The alkaline extract was removed by centrifugation and was acidified to a pH of 4.0 with HCl to precipitate out the protein. The precipitate was washed with ethyl alcohol and with water and was separated by centrifugation to obtain a distillers protein concentrate. The Satterlee article also indicated that various modifications such as sonication, pretreatment with papain and pretreatment with 1% sodium sulfite could be used to effect the amount of protein recovered.

A process is disclosed by Wu, et al., "Protein Concentrate from Normal and High-Lysine Corns by Alkaline Extraction: Preparation," 41 *Journal of Food Science* 509-511 (1976), for recovering protein from corn before it is treated by any other process. The corn is ground in a hammer mill and the protein is extracted by a 0.1N sodium hydroxide solution in two steps. After centrifugation, the alkaline extract from each step is adjusted to a pH of 4.7 to recover the protein as a precipitate. Bran is removed from the starch and protein by screening the second alkaline dispersion, and the protein and starch are separated by centrifugation.

Essentially the same process has been used to recover proteins from sorghums. Wu, "Protein Concentrate from Normal and High-Lysine Sorghums: Preparation, Composition, and Properties," 26 *J. Agric Food Chem.*, 305-309 (1978).

Attempts have also been made to recover protein from other corn products. For example, corn is often processed to recover starch and syrups. One of the by-products of these processes is corn gluten. Corn gluten is generally used as animal feed because of its high unsaturated fatty acid content which promotes rancidity development. A method based on fat extraction to upgrade corn gluten for use in human food is disclosed in Daley, et al., "Food Applications of a Corn Protein Concentrate," Miles Laboratories, Inc., Industrial Products Group. In this process, the wet corn gluten is extracted with a hot ethylacetate-ethanol-water azeotropic mixture. The corn protein is separated by centrifugation which is then washed by water to remove residual solvent and oligosaccharides.

While the foregoing processes provide methods for recovering proteins from corn and other types of grain, they generally do not produce food grade protein or else they are plaqued by other disadvantages. Accordingly, it would be a significant advancement in the art to provide a process for recovering food grade protein from corn and other grains wherein the remainder of the corn could be used in other processes such as alcohol production. Such a process is disclosed and claimed herein.

SUMMARY OF THE INVENTION

The present invention provides a process for recovering a protein concentrate from corn and other agricultural commodities prior to using the remainder of the commodity in additional processes such as alcohol production.

In a preferred embodiment, corn is ground to a meal-like particle size with a comminuting machine which grinds the corn without generating excessive heat. The ground corn is then dispersed in a selected solvent such as a dilute alkaline solution or an alkaline-alcohol solution using a ratio of from 6 to 30 parts of solvent to each part of corn, but preferably a ratio of about 6 to about 15 parts of solvent to each part of corn. The resulting dispersion is then subjected to sonication at a power level, frequency and length of time set to maximize, or at least enhance, protein extraction. During the sonication step, the temperature is generally maintained below about 130° F.

Following sonication and extraction, the dispersion is separated into a solids fraction containing a non protein residue and a liquid fraction containing the protein extract by centrifugation. The solids fraction may be resuspended, if desired, in a second extraction solution for sonication and extraction to remove additional protein. This second mixture is also centrifuged to give a non-protein residue and a second protein extract.

The first and second protein extracts are combined, prefiltered, and pumped to a suitable ultrafiltration membrane. A concentration-dilution-reconcentration ultrafiltration membrane processing technique or a diafiltration and concentration ultrafiltration technique may be used in the protein recovery phase. The protein recovered in the ultrafiltration process can be dried and used in various food products for human consumption.

The ultrafiltration permeates may be added in a permissible quantity to the nonprotein solids from the extraction step for conveying to an alcohol production facility or other use. Alternatively, the ultrafiltration permeate can be pumped to a reverse osmosis membrane system for concentration of the dissolved starches and salts. The concentrated reverse osmosis retentate can be combined in permissible quantities with the nonprotein residue from the extraction step to increase alcohol yield. The reverse osmosis permeate, which is a clear, low-solids content water, can be reused as process water in subsequent protein extractions.

DETAILED DESCRIPTION OF THE PREFERRED EMBODIMENTS

The present invention is directed to a process for recovering protein from corn and other agricultural commodities prior to their being utilized in additional processes such as for alcohol production. The process includes an extraction step wherein the protein is removed from the corn or agricultural commodities in an alkaline solution. After a suitable extraction time, the protein containing extract is separated and is passed through an ultrafiltration filter which separates the protein from the remainder of the extract. The protein can then be dried and further processed for use as a food supplement. The permeate from the ultrafiltration process is subjected to reverse osmosis to concentrate any sugars and other substances remaining in the permeate. The concentrated sugars are added to the nonprotein residue separated in the extraction step and can be utilized in the production of alcohol. As used herein, "nonprotein residue" means the residue remaining after performing protein extractions on the prepared agricultural commodity. The purified water obtained from the reverse osmosis process can be recycled and utilized in subsequent protein extraction procedures.

While the present invention may be utilized with various types of agricultural commodities, it is especially adaptable for use with corn. Accordingly, the following description will generally be directed to use of the present invention with respect to the processing of corn. However, it will be appreciated by those skilled in the art that the invention can also be utilized with other types of agricultural commodities such as sorgum, Jerusalem antichoke, etc. by making suitable adjustments within the skill of those trained in the art.

Figure 1:
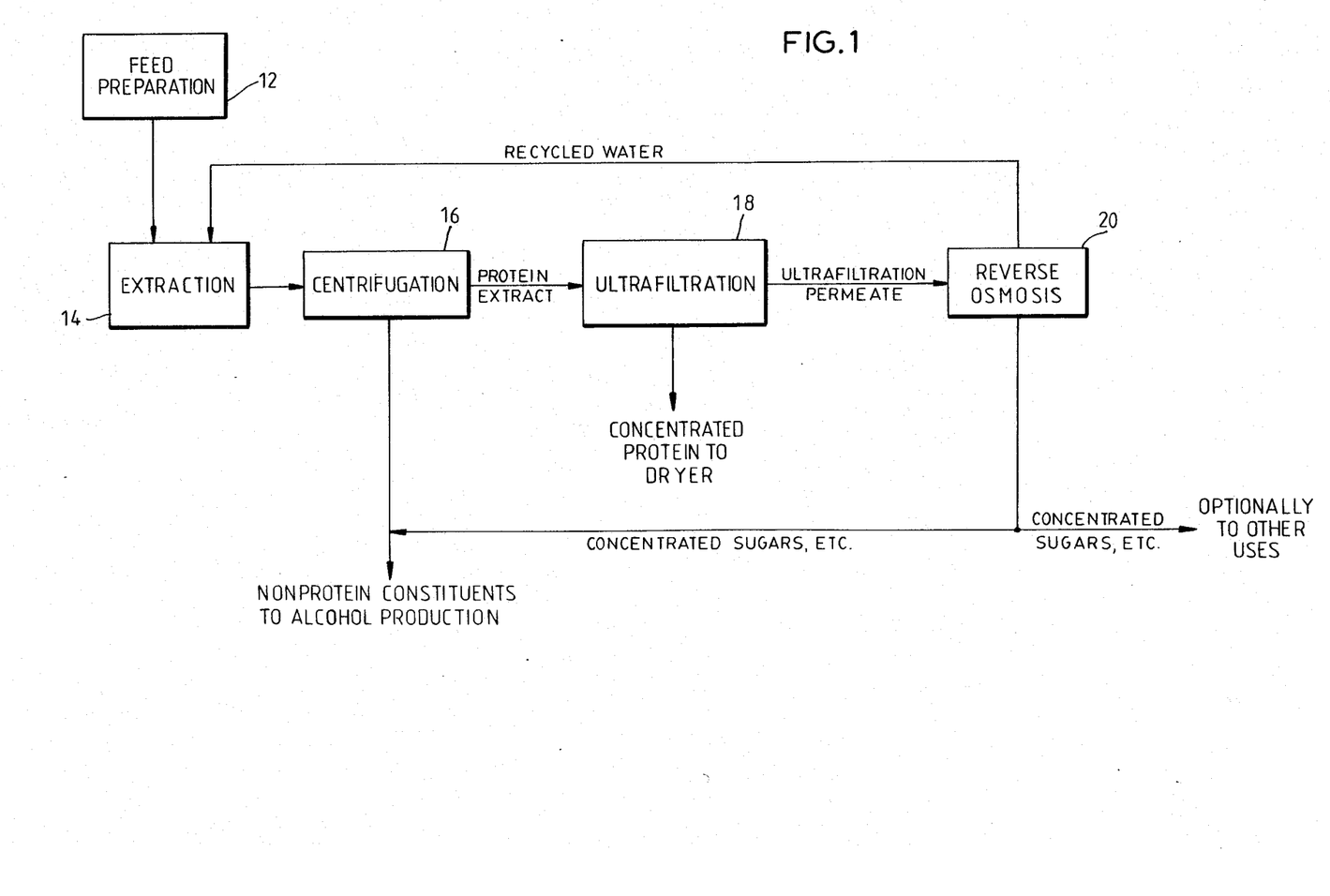
FIG. 1 is a simplified flow diagram of a preferred embodiment of the present invention.

Referring now to FIG. 1, a preferred embodiment of the present invention is schematically illustrated. A suitable agricultural commodity such as corn is prepared for protein extraction in a feed preparation zone 12. In a preferred embodiment, undegermed, yellow, shelled corn is ground into meal utilizing a comminuting machine or grinding mill. It is also possible to grind and utilize degermed corn utilizing the same process. The ground corn is transported from the feed preparation zone into an extraction zone 14 where the protein is extracted from the corn utilizing a suitable solvent.

The predominant class of proteins is corn is zein which can be solubilized by relatively strong alcohol or dilute aqueous alkaline solutions. The second most abundant class of corn proteins is glutelin which is readily soluble in dilute sodium hydroxide or potassium hydroxide.

In a first preferred embodiment of the present invention, the proteins are extracted from corn utilizing a dilute solution of sodium hydroxide with a solvent-to-meal ratio of from about 6:1 to about 15:1. Of course, it will be appreciated that higher solvent-to-meal ratios can also be used. However, such ratios necessitate the use of larger equipment and more solvent without significantly improving the amount of protein recovery. The alkali solution has a pH from about 11.0 to about 12.3 and preferably a pH of about 11.7.

In a second preferred embodiment, the sodium hydroxide extraction step is followed by a second extraction step utilizing either an alkaline solution or an aqueous ethanol solution which is about 50% to 60% ethanol by weight. In a third preferred embodiment, a mixture of aqueous ethanol and dilute sodium hydroxide is utilized as the extracting solvent in either a single or double extraction.

In these extractions, the corn meal slurries are stirred at a temperature from ambient up to about 140° F., but preferably at a temperature of about 120° F. (49° C.) for a suitable period of time. The time required depends upon many factors including particle size, temperature and the nature of the solvent. Generally the times range from about 30 minutes to about two hours, but preferably about 75 minutes. The protein extract then is separated from the nonprotein residue by centrifugation in a centrifuge 16. In the second preferred embodiment utilizing two extraction steps, the residue from the first extraction is resuspended either in the original or a reduced volume of solvent and stirred for an additional period of time such as about 15 minutes before recentrifugation. The extract from the second extraction step then is combined with the extract from the first extraction step for further processing.

In additional preferred embodiments of the present invention, sonication is applied to the corn meal slurry during the extraction step to improve the release of proteins. The ultrasound is applied to the slurry as it passes through a continuous processing cell at an energy level of about 9,000 to about 27,000 watt-seconds per gallon per pass through the cell with a frequency of about 20,000 Hz. Preferably, the energy level is about 10,000 watt-seconds per gallon per pass through the cell. The slurry may be subjected to ultrasound by passing it through the processing cell from one to three times, but preferably about two times. The use of sonication reduces the time necessary to extract the protein and also increases the amount of protein recovered.

Sonication can be applied in a number of ways. In the preferred embodiment, the corn slurry is pumped from a mixing tank and passes through a small sonication chamber. For example, the slurry can be pumped through a continuous processing cell in which a one inch diameter titanium horn is placed. A processing cell such as is supplied with a Branson Model 184V Ultrasonic Processing System can be used for this procedure.

After centrifugation, the protein extract is passed to an ultrafiltration unit 18 to recover the protein.

Ultrafiltration is a technique for separating dissolved molecules on the basis of size and shape by passing the solution through an infinitesimally fine filter. The ultrafilter comprises a tough, thin, selectively permeable membrane which retains molecules above a certain size while allowing smaller molecules, including solvent, to pass into the filtrate. Thus, ultrafiltration provides a retained fraction or retentate which is enriched in large molecules, and a filtrate or permeate which contains few, if any, of these molecules.

Depending upon process conditions, any of a variety of configurations may be suitable for the ultrafiltration membrane, including tubular, hollow fiber, spiral wound, flat leaf or plate and frame systems. The membrane itself may be composed of any one of a number of materials. Either noncellulosic or cellulosic membranes may be used. However, noncellulosic membrane are preferred since they are operable over wider ranges of temperature and pH. For example, the membrane material might be polysulfone or polyvinylchloride.

While various types of ultrafiltration membranes can be utilized, a hollow fiber filtration unit has been found to be useful in the practice of the present invention. The ultrafiltration membrane should have a molecular weight cutoff of about 10,000 to about 30,000 daltons.

Prior to ultrafiltration and usually prior to any prefiltering, the pH of the protein solution or extract is preferably adjusted with hydrochloric acid or any other suitable acid to reduce the pH to about 7 to 10.

As an alternative to ultrafiltration, acid precipitation can be utilized to recover the extracted protein. The protein extract from the centrifuge is adjusted to a pH of about 4.7 with hydrochloric acid whereupon a protein curd is formed. This protein curd is then separated from the whey by centrifugation, adjusted to a pH of about 6.6 with sodium hydroxide and spray dried. However, acid precipitation does not produce recoveries as great as those achieved with ultrafiltration.

The protein concentrate from either the ultrafiltration or the acid precipitation can then be further processed using conventional techniques and utilized as a food supplement.

The permeate from the ultrafiltration process, or the whey if acid precipitation is used, is then subjected to reverse osmosis in reverse osmosis zone 20 in order to concentrate any sugars, salts and other constituents which remain in the solution. Numerous types of reverse osmosis membranes can be used including those made from cellulosic and noncellulosic materials.

The concentrated sugars and salts from the reverse osmosis zone 20 can be combined with the nonprotein residue separated during the centrifugation step after the protein extraction and this mixture can be utilized for alcohol production using standard fermentation techniques. Alternatively, the concentrated sugars and salts can be further processed for other uses. The purified water from the reverse osmosis step can be recycled and used in subsequent extraction procedures.

The present invention is further illustrated by reference to a series of experiments which have been conducted to determine the influence of various changes in the process steps of the preferred embodiments. These examples are provided by way of further elaboration and description and not be way of limitation.

EXAMPLES 1–12

In Examples 1–12, a batch of undegermed, yellow, shelled corn was ground into meal. Fifty gram quantities of the corn meal were extracted using both single extractions and double extractions. The solvents used included both sodium hydroxide solutions and ethanol solutions. Various disorders and combinations of these solvents were tested. The extraction procedures which were used are summarized in Table 1.

TABLE 1

Extraction procedures tested for isolating corn protein from undegermed corn meal.

| Example No. | Extraction Steps | Solvents Used | Solvent-to Meal Ratios | Extraction pH |
|---|---|---|---|---|
| 1 | 1st | NaOH | 10–1 | 11.7 |
|   | 2nd | NaOH | 10–1 | 11.7 |
| 2 | 1st | NaOH | 10–1 | 11.7 |
|   | 2nd | NaOH | 10–1 | 11.7 |
| 3 | 1st | 55% EtOH + 45% 0.1N NaOH | 10–1 | 12.5 |
|   | 2nd | (repeat) | 10–1 | 12.5 |
| 4a | Single | 0.1N NaOH w/sonication | 10–1 | 11.7 |
| 4b | 1st | 55% EtOH w/sonication | 10–1 | 6.3 |
|   | 2nd | 0.1N NaOH w/sonication | 10–1 | 11.7 |
| 5 | Single | 52.2% EtOH + 47.8% 0.1N NaOH | 25–1 | 12.4 |
| 6 | Single | 60% EtOH + 40% 0.01N HCl | 20–1 | 2.9 |
| 7 | Single | 60% EtOH + 40% 0.1N NaOH | 20–1 | 13.3 |
| 8 | Single | 60% EtOH + 40% 0.1N NaOH w/sonication | 20–1 | 13.5 |
| 9 | Single | NaOH | 15–1 | 11.7 |
| 10 | 1st | 55% EtOH + 45% $H_2O$ | 10–1 | 6.3 |
|   | 2nd | NaOH | 10–1 | 11.3 |
| 11 | 1st | NaOH | 10–1 | 11.3 |
|   | 2nd | 55% EtOH + 45% $H_2O$ | 10–1 | 11.6 |
| 12 | 1st | 55% EtOH + NaOH | 10–1 | 11.3 |
|   | 2nd | (repeat) | 10–1 | 11.3 |

As can be seen in Table 1, some of the extractions were performed in two steps and some were performed in a single step. Additionally, in some of the extractions, sonication (as discussed more fully hereinafter) was used in one or both of the extraction steps.

In the extractions made without sonication, corn meal slurries were stirred at 120° F. (40° C.) for 40 minutes. The protein extract then was separated from the nonprotein residue by centrifugation. In those examples utilizing two extractions, the residue from the first centrifugation was resuspended in the original volume of solvent at the same temperature and stirred for an additional 15 minutes before recentrifugation. The extracts from both centrifugations were combined for further processing to recover the protein.

In Examples 1–12 in which sonication was utilized, a BIOSONIK II Ultrasound Generator, manufactured by Bronwill Scientific, Rochester, N.Y., was utilized. The generator was capable of producing an electrical output of 135 watts at 20 kilocycles per second. The 20 kilocycle output was converted to ultrasound by a transducer and emitted into the corn meal slurry by a titanium-iridium tip. The corn meal slurries were treated for five minutes by sonication in a beaker with or without an ice water bath to control the slurry temperature and maintain the temperature below about 130° F. during treatment. After sonication, protein extract was separated from nonprotein residue by centrifugation.

The percentages of original protein, as determined by the Kjeldahl process, and solids extracted by the various examples of Table 1 are shown in Table 2. Protein contents of the extracted solids in the example are also shown. When more than one extraction was made in a procedure, the protein and solids extracted each time are shown, as well as the protein and solids of the combined extracts. The protein in the combined solids is also shown. The combined protein concentration in the solids was determined by analysis rather than numerical calculations from the concentrations of the individual extracts. Accordingly, some variation in the values is present.

TABLE 2

Extractability of solids and protein from undegermed corn meal by various procedures.

| Example No. | Fractions | Extracted Solids (% of total) | Extracted Protein (% of total) | Protein in Solids % |
|---|---|---|---|---|
| 1 | Extract I | 17.27 | 63.96 | 36.37 |
|   | Extract II | 5.98 | 10.65 | 18.91 |
|   | Extract I & II | 23.25 | 74.61 | 25.73 |
| 2 | Extract I | 16.27 | 62.11 | 37.82 |
|   | Extract II | 6.08 | 11.13 | 23.21 |
|   | Extract I & II | 22.35 | 73.24 | 32.25 |
| 3 | Extract I | 12.55 | 75.97 | 60.42 |
|   | Extract II | 3.52 | 9.21 | 30.70 |
|   | Extract I & II | 16.07 | 85.18 | 52.13 |
| $4_a$ | Extract I | 25.49 | 55.65 | 21.38 |
| $4_b$ | Extract I | 3.59 | 15.63 | 37.86 |
|   | Extract II | 35.93 | 32.72 | 8.92 |
|   | Extract I & II | 39.52 | 48.35 | — |
| 5 | Extract I | 15.86 | 80.07 | 48.96 |
| 6 | Extract I | 5.71 | 16.01 | 35.69 |
| 7 | Extract I | 21.06 | 80.49 | 37.42 |
| 8 | Extract I | 19.92 | 83.40 | 40.96 |
| 9 | Extract I | 19.30 | 65.55 | 32.98 |
| 10 | Extract I | 3.40 | 11.50 | 33.16 |
|   | Extract II | 7.37 | 45.70 | 65.29 |
|   | Extract I & II | 10.77 | 57.20 | 52.60 |
| 11 | Extract I | 11.19 | 48.22 | 41.97 |
|   | Extract II | 4.77 | 35.64 | 73.18 |
|   | Extract I & II | 15.96 | 83.86 | 57.88 |
| 12 | Extract I | 9.02 | — | — |
|   | Extract II | 2.23 | 54.27 | 47.24 |
|   | Extract I & II | 11.25 | — | — |

Ideally, it is desired to simultaneously extract the highest percentage of protein with the lowest percentage of solids thus recovering the protein without substantially diminishing the amount of solids available for alcohol production. Inspection of Table 2 reveals that this objective was best achieved in Example 3. In this procedure, 85.18% of the protein was extracted, in conjunction with only 16.07% of the solids. In all, five of the examples (Nos. 3, 5, 7, 8 and 11) extracted more than 80% of the corn meal protein.

In examining the procedures used in these five examples (see Table 1), it can be seen that in each example, the solvent(s) used consisted of aqueous ethanol and dilute sodium hydroxide, either in admixture (Examples 3, 5, 7 and 8) or as separate solvents used in multiple extractions (Example 11). The essential difference between Examples 3 and 7 was that in Example 3, the solvent mixture was used twice at a 10:1 ratio, while in Example 7, the solvent was used once at a 20:1 ratio. The double extraction removes slightly more protein but not more solids.

Example 8 was a repeat of Example 7, except that sonication of the slurry for 5 minutes was added. The effect of sonication was to increase protein extractability by about 3 percent. The limitations of the sonication apparatus available for these tests made is difficult to fully evaluate the increased benefits from this technique.

In Examples 10 and 11, the same solvents were used in the same ratios, except in reverse order. It was found that by using aqueous ethanol first, followed by dilute sodium hydroxide (Example 10), only 57.20% of the protein could be extracted. However, if dilute sodium hydroxide was used first, followed by aqueous ethanol, 83.86% of the protein was extracted with about 16% of the solids.

A comparison of Example 3 with Example 11 reveals the relative efficiency of extracting with dilute sodium hydroxide and aqueous ethanol as a mixture, as opposed to using the solvents separately in a double extraction. As can be seen in Table 2, the results obtained indicate that no benefit is to be expected from separate extractions. The quantities of both protein and solids extracted by each procedure were essentially the same.

The protein was isolated from the extract in Examples 1–12 by ultrafiltration membranes or by isoelectric precipitation. The ultrafiltration processing was performed using a MP-1 Hollow Fiber Filtration Unit, manufactured by Nuclepore Corporation, equipped with either a 30,000 or 10,000 molecular weight cutoff (MWCO) module. Isoelectric precipitation was accomplished by adjusting the pH of the extract to 4.7 with hydrochloric acid. The ultrafiltration retentate and the precipitated curds were freeze dried for analysis. The protein which was recovered was suitable for use as a food supplement.

EXAMPLES 13 AND 14

In Examples 13 and 14, forty pounds of corn meal were extracted utilizing the conditions set forth in Table 3.

TABLE 3

Extraction procedures tested for isolating corn protein from undegermed corn meal.

| | | Extraction Features | | |
|---|---|---|---|---|
| Example No. | Extraction Steps | Solvents Used | Solvent-To Meal Ratios | Extraction pH |
| 13 | Single | Dilute NaOH | 20–1 | 11.2 |
| 14 | 1st | Dilute NaOH | 15–1 | 11.3 |
|    | 2nd | 55% EtOH + 45% $H_2O$ | 10–1 | 11.3 |

As can be seen in Table 3, a dilute sodium hydroxide solution having a pH of 11.2 was used in a single extraction at a 20:1 solvent-to-meal ratio in Example 13. The corn meal slurry was stirred for 40 minutes at 120° F. (49° C.) and separated into liquid and solids with a Sharples P 660 Super-D-Canter.

In Example 14, forty pounds of corn meal were extracted with dilute sodium hydroxide at a pH of 11.3 using a 15:1 solvent-to-meal ratio. The extraction was carried out at 100° F. (37.8° C.) for 30 minutes. After centrifugation with the Sharples Super-D-Canter, the insoluble residue was reextracted for 30 minutes with aqueous ethanol (55% ethanol) using a 10:1 solvent-to-meal ratio at 100° F. (37.8° C.). During recentrifugation to separate the non-protein residue for alcohol production, a solids blockage occurred in the decanter, causing the nonprotein residue to be abnormally high in liquid content and, therefore unusable for ethanol production. The first and second extracts were combined for protein recovery.

The protein extract from Example 13 was divided into two portions. From a first portion, protein was precipitated by a pH adjustment to 4.7 utilizing hydrochloric acid. The protein curd then was separated from the whey by centrifugation, adjusted to a pH of 6.6 and spray dried. The second portion of extract was prefiltered, adjusted to a pH of 10 with hydrochloric acid and was ultrafiltered with a Romicon PM30 industrial hollow fiber ultrafiltration unit at 120° F. (49° C.). The ultrafiltration retentate then was spray dried for analysis. Material balance data were taken to determine protein yields by each recovery method.

In Example 14, one portion of the combined extracts was ultrafiltered and another portion was acid precipitated as was done in Example 13. However, because of safety concerns due to the ethanol in the ultrafiltration retentate, it was freeze dried rather than spray dried. Accordingly, while more protein can be extracted when ethanol is used in conjunction with an alkali solution, it imposes some constraints on the process to overcome the fire hazards.

The percentages of original protein and the solids extracted by the procedures of Examples 13 and 14 are shown in Table 4.

TABLE 4

Extractability of solids and protein from undegermed corn meal by various procedures.

| Example No. | Fractions | Extracted Solids (% of total) | Extracted Protein (% of total) | Protein in Solids % |
|---|---|---|---|---|
| 13 | Extract I | 14.12 | 62.20 | 48.27 |
| 14 | Extract I | 14.98 | 40.01 | 29.13 |
| | Extract II | 7.14 | 24.95 | 40.61 |
| | Extract I & II | 22.12 | 64.96 | 32.04 |

As can be seen in Table 4, only slightly more protein was recovered using the double extraction process of Example 14 than using the single extraction process of Example 13 although considerably more solids were removed. However, upon closer examination it can be seen that there was a major decrease in protein extraction and an increase in solids extracted by the first extract of Example 14. This could have been the result of a number of factors including extraction pH, extraction time, solvent-to-meal ratio, or extraction temperature.

As discussed above, the protein in the extracts was recovered by either ultrafiltration or by acid precipitation.

Table 5 compares yields of original corn meal protein recoverable by ultrafiltration membranes and by acid precipitation for Examples 1, 2, 3, 5 and 13.

TABLE 5

Recovery of solids and protein from undegermed corn meal extracts by ultrafiltration and/or acid precipitation.

| Example No. | Ultrafiltration | | Acid Precipitation | |
|---|---|---|---|---|
| | Solids in Product (% of original) | Protein in Product (% of original) | Solids in Product (% of original) | Protein in Product (% of original) |
| 1 | — | — | 11.24 | 57.14 |
| 2 MWCO - 10,000 | 13.55 | 66.30 | — | — |
| 3 | — | — | 4.76 | 33.41 |
| 5 MWCO - 10,000 | 8.28 | 61.59 | — | — |
| 5 MWCO - 30,000 | 8.28 | 63.56 | — | — |
| 13 MWCO - 10,000 | 5.22 | 53.65 | 7.23 | 35.31 |

As can be seen by examining Table 5, in the best trials about two-thirds of the total protein was recovered by ultrafiltration and approximately 57% of the total protein was recovered by acid precipitation. Additionally, by comparing Table 5 with Tables 2 and 4 it can be seen that the ultrafiltrations technique recovered between about 77 and 90 percent of the extracted protein while the acid precipitation technique recovered only between 40 and 78 percent of the extracted protein.

EXAMPLES 15 AND 16

Samples of degermed and undegermed corn meal were analyzed and then extracted to test the effect of degerming the corn prior to protein recovery. The proximate analyses of the degermed and undermed corn meal are set forth in Table 6.

TABLE 6

Proximate analyses of undegermed and degermed corn meal

| Example No. | Corn-meals | Moisture % | Oil | Total Nitrogen | (N × 6.25) | Ash | Total Sugars |
|---|---|---|---|---|---|---|---|
| | | | | % Dry wt. basis | | | |
| 15 | Undegermed | 11.29 | 3.30 | 1.57 | 9.81 | 1.33 | 2.76 |
| 16 | Degermed | 12.93 | 0.91 | 1.32 | 8.27 | 0.49 | 1.36 |

One hundred gram quantities of degermed and undegermed corn meal were each extracted by stirring the meal in a mixture of 55% ethanol and 45% 0.1N sodium hydroxide for 40 minutes at 115° F. (46° C.). A solvent-to-meal ratio of 25:1 was used. The solids were separated from the liquid extract by centrifugation at 4000 rpm for 15 minutes. The extraction conditions and protein concentration from extracting the degermed and undegermed corn meal are shown in Tables 7 and 8.

TABLE 7

Comparison of extractability of solids and nitrogen from undegermed and degermed corn meal

| Example No. | Corn meals | Extraction Procedure | | | | Extracted Solids (% of total) | Extracted Protein (% of total) | Protein in Solids % |
|---|---|---|---|---|---|---|---|---|
| | | Solvents | Solvent-to-Meal Ratios | Extraction pH | Fraction | | | |
| 15 | Undegermed | 55% EtOH + 45% 0.1N NaOH | 25-1 | 12.6 | Extract 1 | 15.95 | 74.17 | 77.60 |
| 16 | Degermed | 55% EtOH + 45% 0.1N NaOH | 25-1 | 12.8 | Extract 1 | 12.79 | 64.92 | 94.09 |

TABLE 8

Composition of protein products recovered from corn meal extracts

| Example No. | Corn meals | Moist. % | Oil | Total nitrogen | Protein (N × 6.25) | Ash | Total sugars | Color Dry L-scale |
|---|---|---|---|---|---|---|---|---|
| | | | | % Dry wt. basis | | | | |
| 15 | Undegermed | 2.60 | 8.53 | 12.41 | 77.60 | 5.98 | 7.94 | 65.0 |
| 16 | Degermed | 2.76 | 1.09 | 15.06 | 94.09 | 4.10 | 3.88 | 78.9 |

As can be seen in Tables 7 and 8, a higher percentage of solids and nitrogen was extracted from the undegermed corn meal. However, the solids extracted from degermed corn meal were higher in protein than solids from undegermed corn. The presence of oil in the solids extracted from undegermed meal was a contributing factor in lowering the protein percentage.

The liquid extracts from Examples 15 and 16 were prefiltered and then membrane processed through an ultrafiltration membrane as described in Examples 1–12. The yields of solids and protein obtained are set forth in Table 9.

TABLE 9

Recovery of solids and protein from corn meal extracts by laboratory ultrafiltration

| Example No. | Corn meals | Solids in Product (% of original) | Protein in Product (% of original) |
|---|---|---|---|
| 15 | Undegermed | 7.22 | 57.17 |
| 16 | Degermed | 6.83 | 59.57 |

Upon ultrafiltering the extracts from each type of corn meal, a slightly larger percentage of original meal protein and lower percentage of original meal solids were recovered in the ultrafiltration retentate of the degermed meal extract. The protein of the degermed corn would be expected to be of higher molecular weight than the protein of undegermed corn because of the nature of the protein removed during degermination.

The higher oil content of solids extracted from undegermed corn meal caused the dried protein product to be a concentrate with a protein content of 77.60% (dry weight basis) as compared to 94.09% protein isolate from degermed corn. See Table 8.

EXAMPLES 17–19

Protein was extracted from corn grits in a series of experiments to determine the effect of different alkalis on the extraction of protein. One hundred gram quantities of corn grits were slurried in water adjusted to a pH of 11.7 with either NaOH, Ca(OH)$_2$ or KOH. A water-to-grit ratio of 10:1 by weight was used. Extraction was conducted at 115° F. for 40 minutes. The solids were separated from the extract by centrifugation at 4000 rpm for 15 minutes. The separated solids then were resuspended in distilled water at a pH of 11.7, stirred for 15 minutes at 115° F. (40° C.) and recentrifuged. The first and second extracts were combined and the percentage of extracted nitrogen and solids was determined. The results are summarized in Table 10.

TABLE 10

Comparison of extractability of solids and protein from degermed corn grits using different alkalis

| Example No. | Alkali | Extracted Solids (% of total) | Extracted Protein (% of total) | Protein in Solids (% of total) |
|---|---|---|---|---|
| 17 | NaOH | 13.35 | 60.68 | 40.03 |
| 18 | KOH | 14.89 | 61.65 | 38.12 |
| 19 | Ca(OH)$_2$ | 8.23 | 17.95 | 18.88 |

Of the three alkalis tested, KOH extracted about 1% more protein than NaOH and over 43% more protein than Ca(OH)$_2$. However, the KOH also extracted about 1.5% more solids than NaOH. This resulted in a slightly lower protein content in the KOH extracted solids than in the NaOH extracted solids.

EXAMPLES 20 AND 21

Protein was extracted from degermed corn meal and degermed corn grits utilizing the same procedure in order to determine the effect of particle size on the protein extraction. One hundred gram quantities of corn were slurried in water adjusted to a pH of 11.7 with NaOH using a water to corn ratio of 10:1 by weight. The extraction was conducted at 115° F. for 40 minutes. The solids then were separated by centrifugation at 4000 rpm for 15 minutes. The separated solids were resuspended in distilled water at a pH of 11.7, stirred for 15 minutes at 115° F. (46° C.) and recentrifuged. The first and second extracts were combined and the percentage of extracted protein and solids determined. The results of the extractions re shown in Table 11.

TABLE 11

Extractability of solids and protein from degermed corn meal and corn grits with NaOH

| Example No. | Starting Material | Extracted Solids (% of total) | Extracted Protein (% of total) | Protein in Solids (%) |
|---|---|---|---|---|
| 20 | Degermed corn meal | 13.77 | 66.28 | 43.20 |
| 21 | Degermed corn grits | 13.35 | 60.68 | 40.03 |

The proximate analyses of the corn meal and corn grits used are set forth in Table 12. While the composition of the corn meal and corn grits were very similar, a higher percentage of protein was extractable from the corn meal than from the corn grits. See Table 11. It appears that the finer particle size of the meal allowed more protein to defuse to the outside of the particles during the extraction time employed. Solids extracted from the corn meal were also higher in protein.

TABLE 12

Proximate analyses of degermed corn meal and corn grits

| Corn Product | Moisture % | Oil | Total Nitrogen | Protein (N × 6.25) | Ash | Total Sugars |
|---|---|---|---|---|---|---|
| | | | Dry wt. basis | | | |
| Degermed | 10.75 | 0.78 | 1.36 | 8.44 | 0.33 | 0.76 |

TABLE 12-continued

| Corn Product | Proximate analyses of degermed corn meal and corn grits | | | | | |
|---|---|---|---|---|---|---|
| | Moisture % | Oil | Total Nitrogen | Protein (N × 6.25) Dry wt. basis | Ash | Total Sugars |
| corn meal Degermed corn grits | 11.63 | 0.79 | 1.40 | 8.77 | 0.39 | 0.84 |

EXAMPLES 22 TO 24

Several pilot plant trials were conducted in order to determine the effects of pH and the use of ultrasound on the extractability of protein. In Example 22, 62 pounds of degermed corn meal were extracted for 60 minutes at 110° F. (43° C.) with dionized water at a 20:1 water-to-meal ratio which was adjusted to a pH of 11.3 with NaOH. The nonprotein corn was separated from the protein extract utilizing a Sharples P-660 Super-D-Canter. The procedure and results are set forth in Table 13.

In Example 23, 30 pounds of corn meal were dispersed in filtered tap water at a 9:1 water-to-meal ratio which was adjusted to a pH of 11.7 with NaOH. The meal slurry was heated to 110° F. (43° C.) and was circulated from the extraction tank through an ultrasonic processing system set at 50% of maximum power output and back to the extraction tank for a period of 40 minutes to allow each unit volume of slurry to pass through the processing system three times. A Branson Model 184V Ultrasonic Processing System having a power output of 900 watts at 20,000 Hz. and a flow-through cell capacity of 3 gallons per minute (GPM) was used. The ultrasonic processing system then was shut off and extraction continued for 20 additional minutes before centrifugation to separate solids and extract. After centrifugation, the solids were set aside while the extract was processed through an ultrafiltration unit. The ultrafiltration permeate then was used to resuspend the solids from the first extraction to extract additional protein. The suspended solids were circulated through the continuous ultrasonic processing cell during the second protein extraction for another 15 minutes before recentrifugation. The procedure and results of Example 23 are also set forth in Table 13.

In Example 24, 150 pounds of corn meal were dispersed in filtered tap water at a 15:1 water-to-meal ratio and the slurry was adjusted to a pH of 11.7 with NaOH. Protein extraction continued for 75 minutes at 110° F. (43° C.) without the use of ultrasound. The meal slurry was then pumped to a Sharples P-660 Super-D-Canter to separate nonprotein corn from protein extracts. The separation required approximately 110 minutes. The procedure and results are also set forth in Table 13.

As can be seen in Table 13, significantly more protein was recovered in Example 24 having a higher pH than Example 22. Additionally, more protein was extracted in Example 23 with the use of ultrasound at a lower water-to-meal ratio than was extracted without ultrasound in Example 24.

TABLE 13

| | Extractability of solids and protein from degermed corn meal in pilot plant trials | | | | |
|---|---|---|---|---|---|
| Example No. | Procedure | Fractions | Extracted Solids (% of total) | Extracted Protein (% of total) | Protein in Solids |
| 22 | Single NaOH ext'n., pH 11.3, 60 min. 20:1 water-meal ratio | Extract I | 9.58 | 44.79 | 41.38 |
| 23 | 1st. ext'n.: NaOH, pH 11.7, 9:1 water-meal ratio, 60 min. total with ultrasound for 40 min. | Extract I | 9.93 | 50.73 | 43.31 |
| | 2nd ext'n.: UF permeate, pH 11.7, 30 min. total, with ultrasound for 15 min. | Extract II | 14.11 | 22.44 | 13.54 |
| | | Extract I & II | 24.04 | 73.17 | — |
| 24 | Single NaOH ext'n. pH 11.7, 75 min., 15:1 water-meal ratio, without ultrasound. | Extract I | 8.71 | 69.47 | 35.36 |

EXAMPLES 25 TO 28

A series of extractions were performed to determine the effect of extraction time and sonication on the efficiency of protein removal. In each trial, 10 pounds of corn meal were extracted with or without ultrasound. The extraction times varied from 15 to 120 minutes. Ultrasonic power input was set at either 50% or 80% of maximum which was 900 watts at 20,000 Hz. The solids concentration in the corn slurry extracted was varied by using a water-to-meal ratio of either 10:1 or 6:1. A Branson Model 184V Ultrasonic Processing System with a continuous flow processing cell was utilized in these studies. The cell had a flow rate of approximately 3 GPM. The trial procedures and results are set forth in Tables 14–16.

TABLE 14

| | Extraction of corn solids with and without sonication over different time periods | | | | | | | |
|---|---|---|---|---|---|---|---|---|
| Example No. | Extraction Procedure | Percent of Solids Extracted Extraction Times, Min. | | | | | | |
| | | 15 | 30 | 45 | 60 | 75 | 90 | 120 |
| 25 | Single extraction: 10:1 water-to-meal ratio; pH 11.7 without sonication | 10.47 | 10.60 | 10.49 | 10.62 | 12.11 | 12.26 | 12.70 |
| 26 | 1st extraction: | 11.72 | 12.29 | 12.77 | 13.04 | 13.83 | 14.38 | 15.37 |

TABLE 14-continued

Extraction of corn solids with and without sonication over different time periods

| Example No. | Extraction Procedure | Percent of Solids Extracted Extraction Times, Min. | | | | | | |
|---|---|---|---|---|---|---|---|---|
| | | 15 | 30 | 45 | 60 | 75 | 90 | 120 |
| | 10:1 water-to-meal ratio; pH 11.7 sonication at 80% of maximum power | | | | | | | |
| | 2nd extraction:[a] 10:1 water-to-meal ratio; pH 11.7 sonication at 80% of maximum power | 7.82 | 8.69 | 9.35 | 10.09 | 10.94 | 12.22 | |
| 27 | Single extraction: 6:1 water-to-meal ratio; pH 11.7 sonication at 80% of maximum power | 9.32 | 9.93 | 10.80 | 11.40 | 12.06 | 12.65 | 13.57 |
| 28 | Single extraction: 10:1 water-to-meal ratio; pH 11.7 sonication at 50% of maximum power | 9.87 | 12.08 | 12.47 | 12.87 | 13.01 | 13.11 | 13.52 |

[a]Percentage of solids extracted from starting material in second extraction.

TABLE 15

Extraction of corn protein with and without sonication over different time periods

| Example No. | Extraction Procedure | Percent of Protein Extracted Extraction Times, Min. | | | | | | |
|---|---|---|---|---|---|---|---|---|
| | | 15 | 30 | 45 | 60 | 75 | 90 | 120 |
| 25 | Single extraction: 10:1 water-to-meal ratio; pH 11.7 without sonication | 63.70 | 66.61 | 66.89 | 70.05 | 71.75 | 70.63 | 73.04 |
| 26 | 1st extraction: 10:1 water-to-meal ratio; pH 11.7 sonication at 80% of maximum power | 68.33 | 68.91 | 74.15 | 76.71 | 76.86 | 76.65 | 83.92 |
| | 2nd extraction:[a] 10:1 water-to-meal ratio; pH 11.7 sonication at 80% of maximum power | 66.38 | 68.65 | 72.91 | 77.33 | 82.60 | 84.87 | — |
| 27 | Single extraction: 6:1 water-to-meal ratio; pH 11.7 sonication at 80% of maximum power | 65.31 | 72.95 | 76.29 | 77.01 | 78.11 | 78.32 | 81.18 |
| 28 | Single extraction: 10:1 water-to-meal ratio; pH 11.7 sonication at 50% of maximum power | 72.39 | 74.72 | 76.66 | 79.99 | 77.15 | 79.37 | 89.26 |

[a]Percentage of protein extracted from starting material in second extraction.

TABLE 16

Protein in corn solids extracted with and without sonication over different time periods

| Example No. | Extraction Procedure | Percent of Protein in Corn Solids Extracted Extraction Times, Min. | | | | | | |
|---|---|---|---|---|---|---|---|---|
| | | 15 | 30 | 45 | 60 | 75 | 90 | 120 |
| 25 | Single extraction: 10:1 water-to-meal ratio; pH 11.7 without sonication | 52.81 | 52.28 | 51.41 | 47.88 | 45.29 | 43.72 | 42.70 |
| 26 | 1st extraction: 10:1 water-to-meal ratio; pH 11.7 sonication at 80% of maximum power | 49.40 | 47.52 | 49.21 | 49.84 | 47.10 | 46.47 | 46.19 |
| | 2nd extraction:[a] 10:1 water-to-meal ratio; pH 11.7 | 19.78 | 18.25 | 17.93 | 17.50 | 15.98 | 16.18 | — |

TABLE 16-continued

Protein in corn solids extracted with and without sonication over different time periods

| Example No. | Extraction Procedure | Percent of Protein in Corn Solids Extracted Extraction Times, Min. | | | | | | |
|---|---|---|---|---|---|---|---|---|
| | | 15 | 30 | 45 | 60 | 75 | 90 | 120 |
| | sonication at 80% of maximum power | | | | | | | |
| 27 | Single extraction: 6:1 water-to-meal ratio; pH 11.7 sonication at 80% of maximum power | 59.57 | 61.77 | 59.47 | 57.21 | 54.93 | 52.48 | 50.57 |
| 28 | Single extraction: 10:1 water-to-meal ratio; pH 11.7 sonication at 50% of maximum power | 62.23 | 52.40 | 52.10 | 52.66 | 50.08 | 51.08 | 55.90 |

<sup>a</sup>Percentage of solids extracted from starting material in second extraction.

As can be seen in Table 14, more corn meal solids were extracted during the first extraction of Example 26 where sonication was used than were extracted in Example 25 which was performed without sonication.

By reducing the water to meal ratio in Example 27 from that used during the first extraction in Example 26, the percentage of extractable solids was decreased. Additionally, as shown in Example 28, the reduction of the sonication power also reduced solids extraction slightly.

As can be seen in Table 15, protein extraction was enhanced by the use of sonication. The lower water to meal ratio increased the protein extraction efficiency as well as did a reduction in the sonication power.

As can be seen from the foregoing, the present invention provides a suitable process for recovering protein from agricultural commodities, such as corn, while still allowing the commodities to be used for alcohol production.

It will be apparent to those skilled in art having the benefit of this disclosure that various modifications may be made to the disclosed method without deviating from the overall inventive concept. For example, the number and order of extractions may be varied over a wide range as well as the use and power of any sonication. Additionally, various configurations and membranes may be utilized in the ultrafiltration portion of the present invention.

Further modifications and alternative embodiments of the method of this invention will be apparent to those skilled in art in view of this description. Accordingly, this description is to be construed as illustrative only and is for the purpose of teaching those skilled in the art the manner of carrying out the invention. It is to be understood that the forms of the invention shown and described are to be taken as presently preferred embodiments. Accordingly, all changes or modifications which come within the meaning and range of equivalency of the claims are to be embraced within their scope.

What is claimed is:

1. A process for recovering protein from agricultural commodities prior to alcohol production, said process comprising the steps of:
    obtaining a suitable agricultural commodity in a form suitable for extraction of protein;
    extracting protein from said agricultural commodity with an alkali solution which forms a dispersion with said agricultural commodity;
    separating the dispersion into a solids fraction and a liquids fractions, said liquids fraction containing extracted protein;
    removing the protein from said liquids fractions by ultrafiltration using a membrane having a molecular weight cutoff between about 10,000 and about 30,000 daltons; and
    utilizing said solids fraction for alcohol production.

2. A process for recovering protein as defined in claim 1 wherein said extracting step further comprises extracting protein with an alcohol solution in a second extraction.

3. A process for recovering protein as defined in claim 1 wherein said alkali solution in said extracting step includes alcohol.

4. A process for recovering protein as defined in claim 3 wherein said extracting step comprises a first and second extraction.

5. A process for recovering protein as defined in claim 1 wherein said alkali solution has a pH of from about 11.0 to about 12.3.

6. A process for recovering protein as defined in claim 5 wherein said alkali solution has a pH of about 11.7.

7. A process for recovering protein as defined in claim 1 wherein said extracting step further comprises applying sonication to said dispersion of alkali and agricultural commodity for a period of time to enhance protein removal.

8. A process for recovering protein as defined in claim 1 wherein said process further comprises concentrating sugars and starches contained in said liquids fraction after said protein has been removed by ultrafiltration.

9. A process for recovering protein as defined in claim 1 wherein said concentrating step comprises subjecting the liquids fraction to reverse osmosis.

10. A process for recovering protein as defined in claim 1 wherein said obtaining step comprises comminuting corn.

11. A process for recovering protein from agricultural commodities prior to alcohol production, said process comprising the steps of:
    obtaining a suitable agricultural commodity in a form suitable for the extraction of protein therefrom;
    extracting protein from said agricultural commodity with an alkali and alcohol solution which forms a dispersion with said agricultural commodity having a pH from about 11.0 to about 12.3 for between about 30 and about 90 minutes;

separating the solution into a solids fraction and a liquids fraction, said liquids fraction containing extracted protein; and removing the protein from said liquids fraction by ultrafiltration using a membrane having a molecular weight cutoff between about 10,000 and about 30,000 daltons.

12. A process for recovering protein as defined in claim 11 wherein said extracting step further comprises applying sonication to said dispersion of alkali and agricultural commodity for a period of time to enhance protein removal.

13. A process for recovering protein a defined in claim 11 wherein said process further comprises concentrating sugars and starches in said liquids fraction after protein removal by ultrafiltration, said concentrating step comprising using a reverse osmosis membrane.

14. A process for recovering protein defined in claim 11 wherein said obtaining step comprises comminuting corn.

15. A process for recovering protein from corn prior to alcohol production, said process comprising the steps of:

obtaining a suitable quantity of corn;

extracting protein from said corn with an alkali solution having a pH of from about 11.0 to about 12.3;

applying sonication to said dispersion of corn and alkali for at least a portion of said extracting step;

separating the dispersion into a solids fraction and a liquids fraction, said liquids fraction including extracted protein; and removing the protein from said liquids fraction by ultrafiltration using a membrane having a molecular weight cutoff between about 10,000 and about 30,000 daltons.

16. A process for recovering protein from agricultural commodities prior to alcohol production, said process comprising the steps of:

obtaining a suitable agricultural commodity in a form suitable for the extraction of protein therefrom;

extracting protein from said agricultural commodity with an alkali solution which forms a dispersion with said agricultural commodity having a pH from about 11.0 to about 12.3 for between about 30 and about 90 minutes;

applying sonication to said dispersion of alkali and agricultural commodity for a period of time to enhance protein removal;

separating the solution into a solids fraction and a liquid fraction containing extracted protein; and removing the protein from the liquids fraction by ultrafiltration using a membrane having a molecular weight cutoff between about 10,000 and about 30,000 daltons.

17. A process for recovering protein as defined in claim 16 wherein said alkali solution in said extracting step includes alcohol.

18. A process for recovering protein as defined in claim 16 wherein said obtaining step comprises comminuting corn.

* * * * *